June 4, 1957 A. W. SPITZ 2,794,447
MIXING VALVE
Filed May 14, 1954

Inventor:-
Albert W. Spitz
by Arthur N. Klein
Attorney

United States Patent Office 2,794,447
Patented June 4, 1957

2,794,447
MIXING VALVE

Albert W. Spitz, Elkins Park, Pa., assignor to Deruss Machine Products Co., Inc., Philadelphia, Pa., a corporation of Pennsylvania Application May 14, 1954, Serial No. 429,857

11 Claims. (Cl. 137—604)

The present invention relates generally to valves and it relates more particularly to valves designed to mix different fluids in predetermined ratio.

An object of the present invention is to provide a new and improved mixing valve. Another object of the present invention is to provide a relatively simple and inexpensive, positive-acting valve which will mix two different fluids in accurately controllable ratio. A further object of the present invention is to provide a novel mixing throttle valve having a single operating element which will accurately regulate the flow of two separate fluids whereby a predetermined ratio can be maintained regardless of total flow volume.

Other objects and advantages of the present invention are apparent in the following detailed description, appended claims and accompanying drawings.

For many applications, it is desirable to have a mixing valve which will accurately control the ratio of two different fluids, from separate inlets to a single outlet, and which will operate to vary the total volume of flow through a relatively wide range, while maintaining the ratio of the individual fluids at the same or a predeterminedly variable figure.

According to the present invention there has, for the first time, been developed a novel mixing valve of the general character referred to above, wherein a single operating element acts positively to control the total volume of flow by varying the volume of each individual fluid at the same or a predeterminedly variable rate.

For the purpose of illustrating the invention, there are shown in the accompanying drawings forms thereof which are presently preferred and which have been found in practice to give satisfactory results; it being understood, however, that this invention is not limited to the precise arrangements and instrumentalities shown.

Referring to the accompanying drawings in which like reference characters indicate like parts throughout:

Figure 5 is a view generally like that of Fig. 4 but showing a modification in which the throttling stem openings are tapered oppositely from those of Fig. 4.

Figure 1:
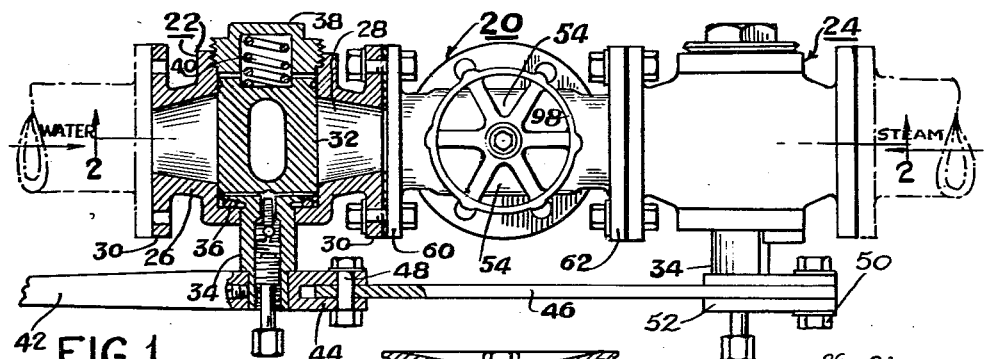
Figure 1 is a top plan view, with parts broken away, showing one embodiment of the present invention.
Figure 2:
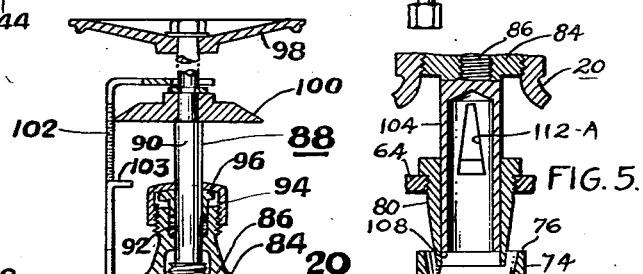
Figure 2 is a vertical cross-sectional view taken generally along the line 2—2 of Fig. 1.
Figure 2:
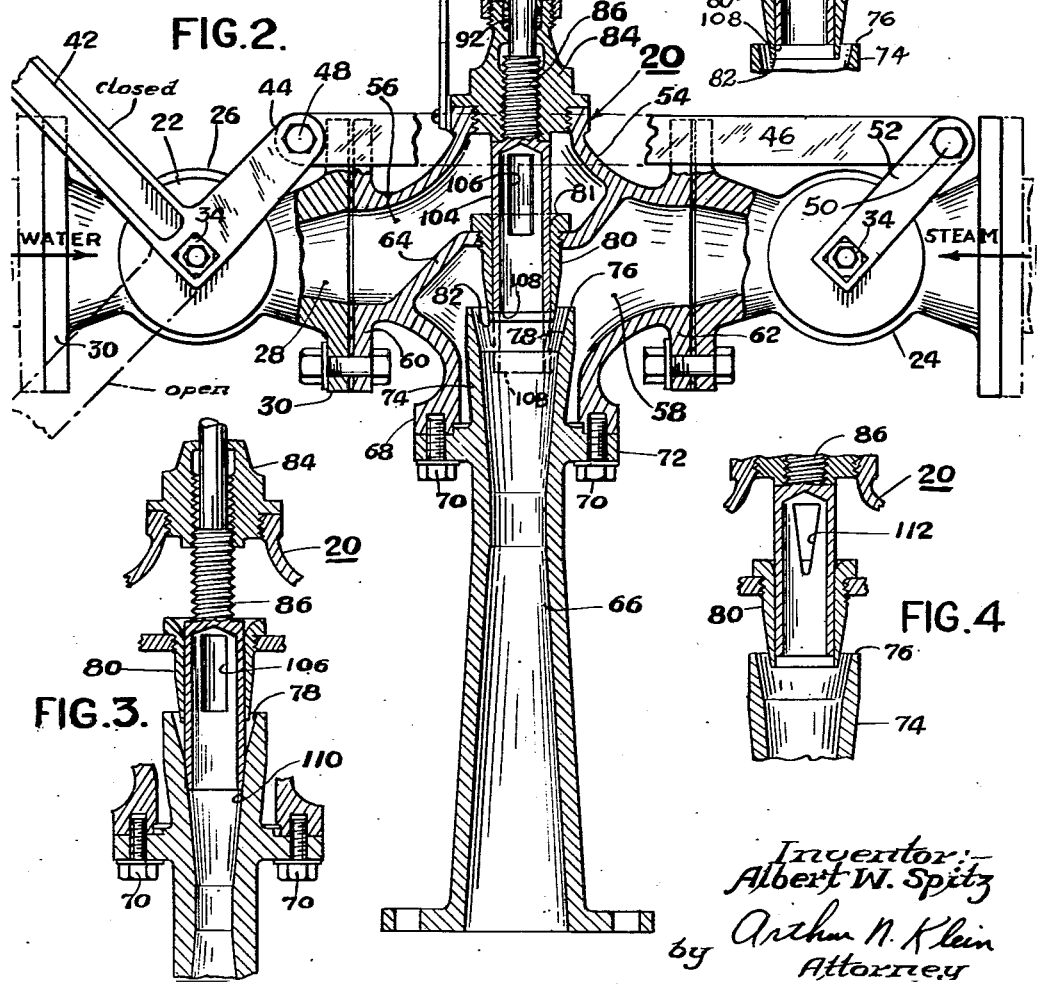

In Figs. 1 and 2 there is shown one embodiment of the present invention representing a valve for mixing water and steam in predetermined ratio and for varying the total rate of flow of the heated water delivered thereby; the mixing throttling valve being shown in conjunction with separate interlinked quick-acting on-off water and steam valves to provide a so-called instantaneous heater, such as is useful for naval and various other installations in which an instantaneous flow of water, heated to a predetermined temperature, and delivered at predetermined volume, is needed.

In Figs. 1 and 2, I have shown my novel mixing valve, indicated generally by the reference character 20, with its two inlet ports operatively connected, in fluid-tight relationship, to separate quick-acting on-off valves 22 and 24, which control the flow of water and steam respectively, to the mixing valve.

The valves 22 and 24 are identical and more or less conventional in structure and it will be understood that the cross-sectional showing of the valve 22, in Fig. 1, is applicable also to the valve 24.

Thus, as shown in Fig. 1, the valve 22 includes a body 26 having an axial fluid opening or passageway 28 formed therein and provided with flanges 30 at its ends so that it can be connected, in fluid-tight relationship, to the mixing valve 20 and to the water inlet line.

An apertured valve plug 32 is rotatably mounted within the body 26 and is constructed and arranged to be rotated 90 degrees to either full open or full closed position in conventional manner. The valve plug 32 is provided with an extension or stem 34 which passes through an opening formed in the front of the body 26; a gasket 36 providing a fluid-tight rotatable seal therebetween. A cap nut 38 is screw-threadedly mounted within an aligned opening at the back of the body 26 and supports a coil spring 40 which bears against the end of the valve plug 32 and urges it against the gasket 36.

Mounted on the protruding end of the extension 34 is an operating handle 42 having a bifurcated extension 44.

A link 46 is pivotally connected, at one end, to the bifurcated end of the extension 44 by a pin 48. The other end of the link 46 is pivotally connected, by a pin 50, to the bifurcated end of an arm 52 mounted upon the valve plug extension 34 of the steam valve 24.

In the solid-line position of Figs. 1 and 2 the operating handle 42 is shown in elevated valve-closing position. When the operating handle 42 is rotated counterclockwise 90 degrees to the position shown in dash-dot lines in Fig. 2, the valve plug 32 of the valve 22 is rotated to valve-opening position and, at the same time, the link 46 and the arm 52 cause similar valve-opening rotation of the valve plug in the steam valve 24.

In other words, when the operating handle 42 is pulled down, both the water valve 22 and the steam valve 24 are shifted quickly to open position and, when the operating handle 42 is returned to its original uppermost position, both valves quickly shut off.

Where the water-steam mixture is intended for human use (as for example in shower baths) I prefer to set the valves 22 and 24 so that the valve 22 always opens slightly in advance of the valve 24, and thereby eliminates the possibility of the user being scalded by live steam under pressure.

Coming now to the structure of the mixing valve 20, as best shown in Fig. 2, I may provide a body or housing 54 having a water-inlet passageway 56 at one end and a steam-inlet passageway 58 at the other end; flanges 60 and 62 respectively being provided for said passageways to permit fluid-tight connection to the valves 22 and 24 in the manner referred to above. A water inlet passageway 56 leads to the upper portion of the body 54 while the steam inlet passageway 58 leads to the lower portion of said body 54; the passageways being separated by a wall 64 to be more fully described hereinbelow.

A vertically disposed diffuser or outlet passageway 66 is secured, in fluid-tight relationship, to a flange opening 68 formed in the bottom of the body 54 by means of a plurality of bolts 70 which extend through an apertured flange 72 formed intermediate the ends of the diffuser 66.

The greater portion of the diffuser protrudes downwardly below the valve body 54. However, the upper portion 74 of the diffuser 66 extends appreciably upwardly into the valve body.

Extending downward from the uppermost open end 76 of the upwardly directed portion 74 of the diffuser 66, there is formed a downwardly tapered frusto-conical inner surface 78, the function of which will be described hereinbelow.

The dividing wall 64 of the body 54 is provided with a screw-threaded opening, through which extends a downwardly-directed cylindrical sleeve 80 which is in axial alignment with the diffuser 66; the lowermost annular end 82 being smaller in diameter than the uppermost end 76 of the diffuser and protruding slightly downward thereinto. A slight flare 81 may be provided at the upper end of the inner cylindrical surface of the sleeve 80.

It can been seen that the lowermost annular end 82 of the sleeve 80 and the frusto-conical surface 78 provide an annular opening through which steam is free to pass from the passageway 58 downward into the diffuser 66.

An axially apertured plug or bonnet 84 is screw-threadedly mounted within an opening formed in the top of the valve body 54, above and in alignment with the sleeve 80.

The axial opening of the bonnet 84 is screw-threaded to receive the screw-threaded intermediate portion 86 of a throttling stem 88; the upper unthreaded portion 90 of which protrudes upwardly beyond the bonnet 84. A rotatable fluid-tight seal is provided intermediate the bonnet 84 and the stem portion 90 by means of packing 92, a packing nut 94 and a packing gland 96.

The hand wheel 98 is mounted at the uppermost free end of the stem portion 90 with an indicator collar 100 disposed slightly therebelow. The collar 100 cooperates with a calibrated vertical indicator scale or blade 102 to provide accurate visual indication of the position of the throttling stem 88 relative to the body 54. The blade 102 has a protruding stop portion 103 which limits inward movement of the collar 100 and stem 88.

Below the screw-threaded portion 86 of the throttling stem 88, there is provided a hollow cylindrical portion 104 which extends downward into the sleeve 80 in fluid-tight, yet rotatable, relationship therewith.

Extending part way down from the upper end of the hollow cylindrical portion 104 are a pair of axially-elongated diametrically opposed openings or ports 106.

It can be seen that, when the throttling stem 88 is in elevated position, the openings 106 are exposed above the upper end of the sleeve 80 so that water entering the body 54 through the water inlet passageway 56 can flow into the hollow portion 104 and, from there, downward into the diffuser 66, at which point it mixes with the steam entering the diffuser through the annular clearance between the end 82 and the surface 78 as described above.

As the throttling stem 88 is gradually moved downward (by turning of the hand wheel 98) an increasingly greater proportion of the openings 106 is moved downward into, and covered by, the sleeve 80, so that the flow area is correspondingly reduced.

This downward movement of the throttling stem 88 also causes the lowermost annular edge 108 of the hollow cylindrical portion 104 to move downward beyond the lowermost end 82 of the sleeve 80 and into the frusto-conical surface 78 of the diffuser 66 so as gradually to reduce the annular steam inlet area.

In other words, as the throttling stem 88 is moved downward, it acts simultaneously to cut down on the flow of both the water and the steam.

By properly proportioning the areas of the openings 106 and the annular area intermediate the edge 108 and the frusto-conical surface 78, it is a simple matter to maintain the same ratio of steam-to-water, regardless of the extent of throttling of total flow.

In other words, by properly adjusting the position of the throttling stem, the valve 20 can be set to deliver any volume of water (heated to a predetermined temperature) ranging from the full capacity of the valves 22 and 24 down to a very small fraction thereof, upon manipulation of the operating handle 42.

In the embodiment of Figs. 1 and 2 the throttling stem 88 is so set that it never fully closes off the water or the steam; final shut-off being accomplished by the separate water and steam valves 22 and 24 as described above.

Figure 3:
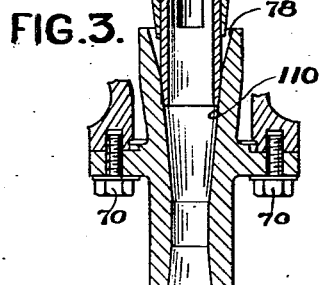
Figure 3 is a fragmentary cross-sectional view showing a modified embodiment wherein the operating member provides full shut-off for both fluids.

In Fig. 3 there is shown a modified embodiment in which the throttling stem and the diffuser are designed to effect complete shut-off of both the water and the steam.

Thus, in this embodiment, the uppermost ends of the water inlet openings 106 in the hollow cylindrical portion 104 are constructed and arranged to be fully inserted into, and covered by, the sleeve 80 at the same time that the lowermost annular edge 108 of the cylindrical portion 104 seats against the lesser-tapered frusto-conical inner surface 110 formed in the diffuser directly below the surface 78. To insure a firm fluid-tight seal, the lowermost edge 108 of the cylindrical portion 104 may be given a slight taper along its outer surface.

Figure 4:
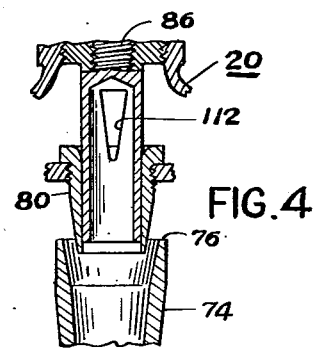
Figure 4 is a fragmentary vertical cross-sectional view showing another embodiment of the present invention wherein the operating member serves to vary the ratio as well as the total rate of flow of the two fluids being mixed.

In Fig. 4 there is shown another embodiment of the present invention which corresponds generally to that of Figs. 1 and 2 except that the openings 112 in the hollow cylindrical portion 104 of the throttling stem 88 (instead of being constructed with parallel axially-extending sides like the openings 106) are formed with downwardly converging sides.

The effect of this change in configuration of the openings 112 is to change the ratio of steam-to-water as the total volume is being changed. In other words, since the narrower tapered ends of the openings 112 are first closed off, the reduction in flow of water is less than that achieved with the embodiment of Figs. 1 and 2, so that the temperature of the heated water emerging from the diffuser is somewhat lower at low rates of flow than at higher rates of flow.

It is evident that, by changing the shape of the openings 112 so that they taper upwardly instead of downwardly, the opposite result could be obtained, so that the temperature of the heated water emerging from the diffuser would be somewhat higher at low flow rates than at higher flow rates. Thus, in the modified embodiment of Fig. 5, the openings 112-A in the hollow cylindrical stem portion 104 are shown as formed with upwardly converging sides.

The degree of taper shown in Fig. 4 and also in Fig. 5 is exaggerated for clarity of illustration. In actual practice the angle of taper would be very much smaller unless extreme variations in temperature with total flow rate are desired. It is, of course, possible to incorporate combinations of different tapers or other nonsymmetrical shapes into the openings in the hollow cylindrical portion 104 to give any desired control of temperature with total flow rate.

It would also be possible to provide the inner surface 78 with varying degrees of taper to cause variation in the ratio of steam-to-water delivered to the diffuser with change in total volume.

While described above in connection with the mixing of water and steam, the novel mixing valve of the present invention has many other uses, within the broad field of fluids and semifluids. Thus, for example, the valve can be used in mixing other liquid-and-gas combinations. It can be used in mixing two different liquids. It can be used in mixing different gases or sprays or aerosols. It can even be employed where one of the materials is a semifluid slurry, as for example a suspension of a solid in a liquid.

Also the present invention has another important advantage in permitting proportional mixing of a low pressure fluid with a high pressure fluid. Thus, in the embodiment of Fig. 1, the water or other fluid entering the fluid inlet passageway 56 through the valve 22 may be at much higher pressure than the steam or other fluid entering the fluid inlet passageway 58 through the valve 24. In such case, the diffuser 66 acts as a Venturi; the high pressure fluid entering the upper end of the diffuser through the open end 108 of the throttling steam generating suction which serves to pull the lower pressure fluid through its annular opening into the diffuser wherein it is mixed and entrained with the higher pressure fluid. Accurate mixing has been achieved, for example, where the water entering through the valve 22 is at a pressure of 100 pounds per square inch while the steam entering through the valve 24 is at a pressure of only 30 to 40 pounds. The importance of this can be readily appreciated when it is considered that this entraining action reduces operating costs by eliminating the need for maintaining both fluids at the high pressure which is needed in the final mixture. The present invention may be embodied in other specific forms and, therefore, the foregoing embodiments are to be considered in all respects as illustrative and not restrictive, reference being made to the appended claims as indicative of the scope of this invention.

Having thus described my invention, I claim as new and desire to protect by Letters Patent the following:

1. In a mixing valve, a body having two separate fluid inlet passageways with a dividing wall therebetween, and having a single outlet passageway comprising an elongated hollow diffuser, one end of said diffuser extending inwardly within the body and communicating with one of said inlet passageways, the inner open end of the diffuser having an inwardly tapered inside surface, a generally cylindrical sleeve mounted in and extending through said dividing wall in axial alignment with said diffuser, one end of said sleeve terminating generally adjacent the inner end of said diffuser, and an elongated throttling stem mounted on the valve body and arranged for axial movement relative thereto, said throttling stem being in axial alignment with said sleeve and said diffuser, said throttling stem having an operating handle on its outermost protruding end and having a hollow generally cylindrical portion at its other end fitting within said sleeve in fluid-tight yet slidable relationship therewith, said hollow cylindrical portion having an axial dimension substantially greater than that of the sleeve and a diameter somewhat smaller than that of the inner end of the diffuser, said hollow cylindrical portion being open at its free end so as to provide an annular peripheral edge, said annular peripheral edge and the tapered inside surface of the diffuser forming an annular orifice of progressively smaller area between the diffuser and communicating inlet passageway when the throttling stem is moved axially so that the free end of its hollow cylindrical portion protrudes beyond the sleeve and into the diffuser, said hollow cylindrical portion having an axially-elongated slot formed adjacent its other closed end, said slot providing communication between the other of said inlet passageways and the diffuser, said slot being progressively covered by the sleeve as the throttling stem is moved axially toward the diffuser, whereby the orifices available for fluid flow from both inlet passageways to the diffuser are varied simultaneously in area upon axial movement of the throttling stem.

2. A construction according to claim 1, wherein the axially-elongated slot in the hollow cylindrical portion is provided with generally parallel axially-extending sides so that the orifice area varies uniformly with axial movement of the throttling stem.

3. A construction according to claim 1, wherein the axially-elongated slot in the hollow cylindrical portion is provided with tapered side walls so that the rate of change in orifice area varies with axial movement of the throttling stem.

4. A construction according to claim 3 wherein the sides of the axially-elongated slot are tapered so as to converge in the direction of the free open end of the hollow cylindrical portion.

5. A construction according to claim 3 wherein the sides of the axially-elongated slot are tapered so as to converge toward the closed end of the hollow cylindrical portion.

6. A construction according to claim 1 wherein the throttling stem is screw-threadedly mounted, and wherein an indicating collar is mounted on the protruding portion of the stem, and wherein an elongated calibrated indicator scale is mounted adjacent the indicating collar in generally parallel relationship with the throttling stem.

7. A construction according to claim 1 wherein the annular free edge of the hollow cylindrical portion of the throttling stem is constructed and arranged to seat against the tapered inside surface of the diffuser at the same time that the axially-elongated slot is fully closed by the sleeve, so that the orifices from both inlet passageways to the diffuser are closed off substantially together.

8. A construction according to claim 1 wherein the valve is constructed and arranged to deliver hot water, the first mentioned communicating inlet passageway being constructed and arranged to deliver live steam to the diffuser through the annular orifice, while the other inlet passageway is constructed and arranged to deliver cold water to the diffuser through the axially-elongated slot in the hollow cylindrical portion of the throttling stem.

9. A construction according to claim 1 wherein the inlet passageways of the mixing valve are connected to interlinked quick-acting on-off valves which in turn are connected to fluid inlet lines, whereby, upon opening of the two interlinked on-off valves, the mixing valve will deliver a predetermined volume of mixed fluids from its outlet passageway.

10. A construction according to claim 9 wherein a high pressure steam line is connected to the first mentioned communicating inlet passageway so that steam is delivered into the diffuser through the annular orifice, and wherein a cold water line is connected to the other inlet passageway of the mixing valve whereby cold water is delivered to the diffuser through the axially-elongated slot in the hollow cylindrical portion of the throttling stem.

11. A construction according to claim 1 wherein a high pressure fluid is delivered to the diffuser through the lower open end of the throttling stem while a lower pressure fluid is delivered to the diffuser through the first mentioned communicating inlet passageway and the annular orifice; the flow of the high pressure fluid into the diffuser causing a Venturi effect which generates suction operating to entrain and mix the lower pressure fluid with the high pressure fluid.

References Cited in the file of this patent

UNITED STATES PATENTS

| | | |
|---|---|---|
| 174,578 | Rynear | Mar. 7, 1876 |
| 747,487 | Rollins | Dec. 22, 1903 |
| 1,017,789 | Murphy | Feb. 20, 1912 |
| 1,111,343 | Wollheim | Sept. 22, 1914 |
| 1,792,906 | Heilos | Feb. 17, 1931 |
| 2,035,472 | Hammond | Mar. 31, 1936 |